US012728357B2

(12) United States Patent
Amadori

(10) Patent No.: US 12,728,357 B2
(45) Date of Patent: Sep. 8, 2026

(54) SYSTEMS AND METHODS FOR PROVIDING PERSONALIZED EXPERIENCES IN VIRTUAL ENVIRONMENTS

(71) Applicant: Sony Interactive Entertainment Europe Limited, London (GB)

(72) Inventor: Pierluigi Vito Amadori, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 227 days.

(21) Appl. No.: 18/583,116

(22) Filed: Feb. 21, 2024

(65) Prior Publication Data

US 2024/0278134 A1 Aug. 22, 2024

(30) Foreign Application Priority Data

Feb. 22, 2023 (GB) ..................................... 2302556

(51) Int. Cl.

| | |
|---|---|
| ***A63F 13/67*** | (2014.01) |
| ***A63F 13/211*** | (2014.01) |
| ***A63F 13/22*** | (2014.01) |
| ***A63F 13/355*** | (2014.01) |
| ***A63F 13/79*** | (2014.01) |

(52) U.S. Cl.

CPC ............ *A63F 13/67* (2014.09); *A63F 13/211* (2014.09); *A63F 13/22* (2014.09); *A63F 13/355* (2014.09); *A63F 13/79* (2014.09); *A63F 2300/8082* (2013.01)

(58) Field of Classification Search

CPC ...... A63F 13/211; A63F 13/212; A63F 13/22; A63F 13/355; A63F 13/67; A63F 13/79; A63F 2300/8082; G06F 2203/011

See application file for complete search history.

(56) References Cited

U.S. PATENT DOCUMENTS

| | | | | |
|---|---|---|---|---|
| 10,152,118 | B2 * | 12/2018 | Primus | A63F 13/212 |
| 10,191,920 | B1 * | 1/2019 | Grundmann | G06V 10/95 |
| 10,216,474 | B2 * | 2/2019 | Milevski | G06F 1/163 |
| 10,802,580 | B2 * | 10/2020 | Sanger | A63F 13/65 |
| 11,481,946 | B2 * | 10/2022 | Shimizu | A63F 13/65 |
| 12,217,367 | B2 * | 2/2025 | Yilanci | H04L 67/131 |
| 12,405,671 | B2 * | 9/2025 | Amadori | A63F 13/422 |

(Continued)

FOREIGN PATENT DOCUMENTS

| | | |
|---|---|---|
| KR | 1020220026629 A | 3/2022 |
| WO | 2023075945 A1 | 5/2023 |

OTHER PUBLICATIONS

Combined Search and Examination Report for related UK Patent Application No. 2302556.2 issued Jun. 9, 2023, from the UK Intellectual Propery Office.

*Primary Examiner* — William H Mcculloch, Jr.

(74) *Attorney, Agent, or Firm* — Kilpatrick Townsend & Stockton LLP

(57) ABSTRACT

A computer-implemented system and method of providing a personalized experience to players of applications delivering a virtual environment, such as a virtual game world. A cloud-deployed machine learning (ML) model implements a player state service to gather data from input devices and historical data, such as past game-play, to infer physiological and behavioral data (a player state vector) which may be used to represent the current cognitive state of the player.

20 Claims, 4 Drawing Sheets

Receive sensor data from user peripheral(s) — 402

Generate state vector from sensor data — 404

Infer cognitive state of user within virtual environment based on state vector — 406

(56) References Cited

U.S. PATENT DOCUMENTS

2010/0267450 A1* 10/2010 McMain ............... A63F 13/822 463/43
2012/0194648 A1* 8/2012 Hofshi .................... A63F 13/67 348/46
2013/0117377 A1* 5/2013 Miller ..................... A63F 13/92 709/205
2014/0223462 A1 8/2014 Aimone et al.
2016/0042566 A1* 2/2016 Mao ...................... A63F 13/211 463/31
2016/0063883 A1 3/2016 Jeyanandarajan
2016/0077547 A1* 3/2016 Aimone ................ A61B 5/1114 345/8
2017/0339338 A1* 11/2017 Gordon .................. G06V 40/20
2018/0011682 A1* 1/2018 Milevski ................. A63F 13/47
2018/0024626 A1* 1/2018 Sanger ................. G06V 40/175 463/13
2018/0314321 A1* 11/2018 Primus .................... G06F 3/011
2020/0175057 A1 6/2020 Marvaniya et al.
2020/0206631 A1* 7/2020 Sumant ................... A63F 13/55
2020/0269132 A1* 8/2020 Turner .................. A63F 13/216
2020/0302825 A1 9/2020 Sachs et al.
2020/0342648 A1* 10/2020 Shimizu ................... A61B 5/16
2020/0384359 A1* 12/2020 Brown .................... A63F 13/71
2020/0388387 A1* 12/2020 Rebolledo Mendez ..................... H04L 67/12
2022/0130077 A1 4/2022 Rajarathnam et al.
2023/0047787 A1* 2/2023 Chappell, III ......... A61B 5/486
2023/0053767 A1* 2/2023 Claesen ................ A63F 13/213
2024/0179167 A1* 5/2024 Murphy ................. G06N 3/045
2024/0185135 A1* 6/2024 Spick ..................... G06N 3/045
2024/0192778 A1* 6/2024 Amadori ................. G06F 3/016
2024/0278134 A1* 8/2024 Amadori ............... A63F 13/212
2025/0114706 A1* 4/2025 Monti ..................... A63F 13/65

* cited by examiner

SYSTEMS AND METHODS FOR PROVIDING PERSONALIZED EXPERIENCES IN VIRTUAL ENVIRONMENTS

CROSS-REFERENCE TO RELATED APPLICATIONS

This application claims priority to and the benefit of United Kingdom Patent Application No. GB 2302556.2, filed on Feb. 22, 2023, and entitled, "DYNAMIC CONTENT," the entire content of which is incorporated herein by reference.

FIELD

The present specification relates to the display of personalized experiences in virtual environments, such as virtual game worlds. In particular, the present specification provides computer-implemented systems and methods of distributing customized, dynamic content through a distributed processing system (i.e. the cloud).

BACKGROUND

In many virtual game worlds, the rules and/or mechanics of the game can represent a barrier to enjoyment of the game for certain users. For instance, in certain games, it is necessary to complete a particular challenge or master a particular battle mechanic before progressing to a new game level: this may be discouragingly difficult, tediously time consuming, or even at times distressing, depending upon the user.

It is known to allow users (i.e. players of a game) to select a "difficulty" level for themselves (this being stored in a player profile for future use in that game). It is also known to generate a more detailed player profile that may be used by game developers to personalize the player experience. In some cases, the player profile may be based on: pregame "character-building" selections (e.g. "rogue, "mage", or "fighter" etc.); in-game user selections/choices in role-playing games; or questionnaires that tailor the story according to a personality quiz. This player profile may be stored in local memory (e.g. console memory, PC hard disk, etc.). However remote storage, in the storage means of a game server, for example, has the advantage that the user may access their profile from whichever game device they happen to be using, provided they have access to the remote storage.

In cloud gaming, users are able to access a number of games (along with player profile information) on a cloud gaming site over a network, such as the Internet, and begin interaction/playing the game. In order to select a game for game play, a user accesses his/her account on the cloud gaming site. The user is provided with a list of games that are available for the user account for game play. The user account will typically, for each available game, store at least one corresponding player profile indicating game progress and settings (e.g. video resolution, refresh rate, audio levels etc.), user selected difficulty level, avatar personalization, subscriptions etc. corresponding to the game.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a computer-implemented method of providing dynamic content in a virtual environment hosted on a cloud platform, comprising: providing a virtual environment to a user; estimating a cognitive state of the user; and generating content in the virtual environment according to the cognitive state of the user.

In certain embodiments, estimating the cognitive state of the user may comprise at least one of: estimating the cognitive state of the user in real time; and estimating a change in cognitive state of the user over a predetermined period.

In certain embodiments, cognitive state is estimated by: receiving sensor data from user peripherals, the sensor data indicative of behavioral and/or physiological signals; and generating, in a machine learning cloud-deployed model, a state vector from the sensor data, the state vector representing the estimated cognitive state of the user.

In certain cases, the sensor data indicative of behavioral signals (i.e. behavioral data) may include at least one of reaction times, frequency of button presses, and speed on left/right thumb-sticks. Moreover, sensor data indicative of physiological signals (i.e. physiological data) may include at least one of: hand poses estimated from an accelerometer and/or gyroscope in a user peripheral, eye or gaze tracking in VR-based games, headphone audio pickup, head poses estimated from an accelerometer and/or gyroscope in a head mounted display, HMD, or headphones, or galvanic skin response or electrochemical activity detected in a user peripheral.

In one embodiment, the machine learning cloud-deployed model is a generalized user agnostic model that is trained from an offline dataset and deployed on the cloud platform. Here, the training data set may be a labelled collection of cognitive states according to different physiological and behavioral signals from a plurality of users.

In another embodiment, the machine learning cloud-deployed model is a model trained based on a specific player through federated learning and deployed on the cloud platform, thereby training personalized models. Here, training through federated learning may include performing user calibration during a first setup phase for said specific player.

Optionally, said user calibration may include, for a predetermined application, collection of data from interaction with a predetermined calibration application. Here, the user calibration data may be stored locally. Further updates corresponding to changes in user interactions may then be transmitted to the cloud-based model.

In certain embodiments, once the machine learning cloud-deployed model is trained and deployed on the cloud platform, the computer-implemented method may further comprise providing a query-based interface thereby rendering estimates of the cognitive state vector from the model accessible from an engine providing the virtual environment.

The cognitive state of the user may indicate that the user is at least one of: tired, stressed, bored, or engaged.

In a further aspect of the present disclosure, there is provided a system comprising: a processor; and memory including executable instructions that, as a result of execution by the processor, causes the system to perform the computer-implemented method of any preceding embodiment.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1A:
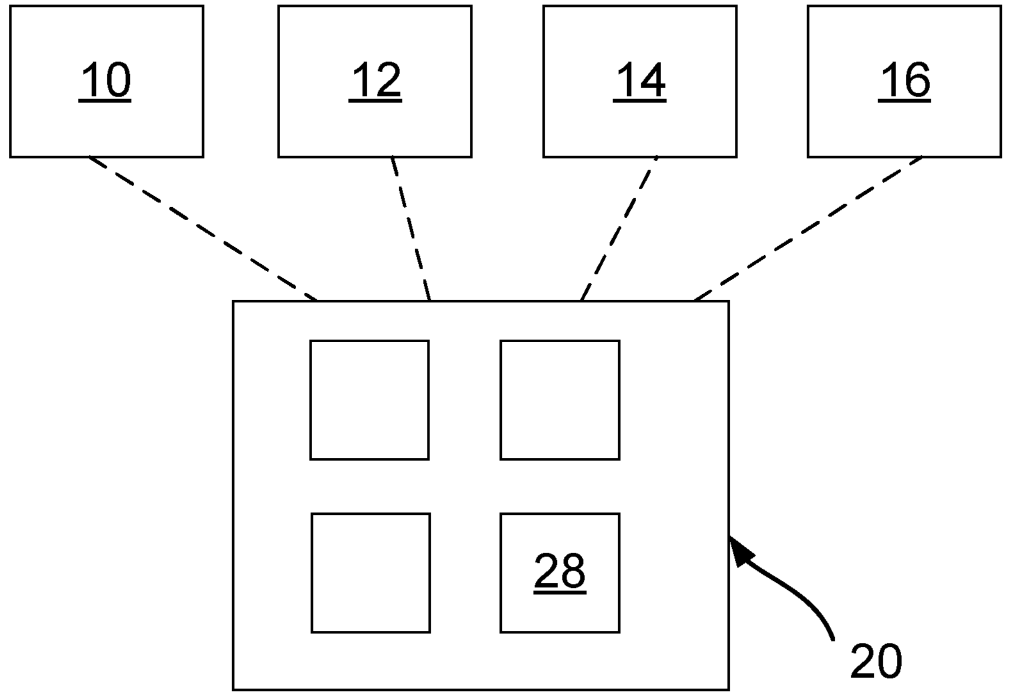
FIG. 1A is a diagram showing a system according to an embodiment of this disclosure.

FIG. 1A shows a system according to an embodiment of the present disclosure. The system comprises an electronic device 20 comprising at least one processor and memory. The electronic device 20 is configured to communicate directly or indirectly with a plurality of remote or external electronic devices 10, 12, 14 and 16. In some embodiments, the electronic device 20 may be configured to establish a wireless communication channel between one or more of the plurality of electronic devices 10, 12, 14 and 16. Each of the electronic devices may be, but are not limited to, a PC, a gaming console, a tablet or a smart phone.

The electronic device 20 comprises a platform configured to host a virtual environment. The virtual environment may be 2D or 3D. In some embodiments, the virtual environment may be provided by a computer game run on the electronic device 20. In some embodiments, the electronic device 20 may be a gaming console or PC configured to run a computer game that includes a virtual environment for users (i.e., players).

In the embodiment shown in FIG. 1A, the electronic device 20 comprises a communication unit 28 for communicating with other applications or programs on the electronic device 20 and with external applications or electronic devices 10, 12, 14, 16. It will be appreciated that these features may be provided as software components of the electronic device 20.

Figure 1B:
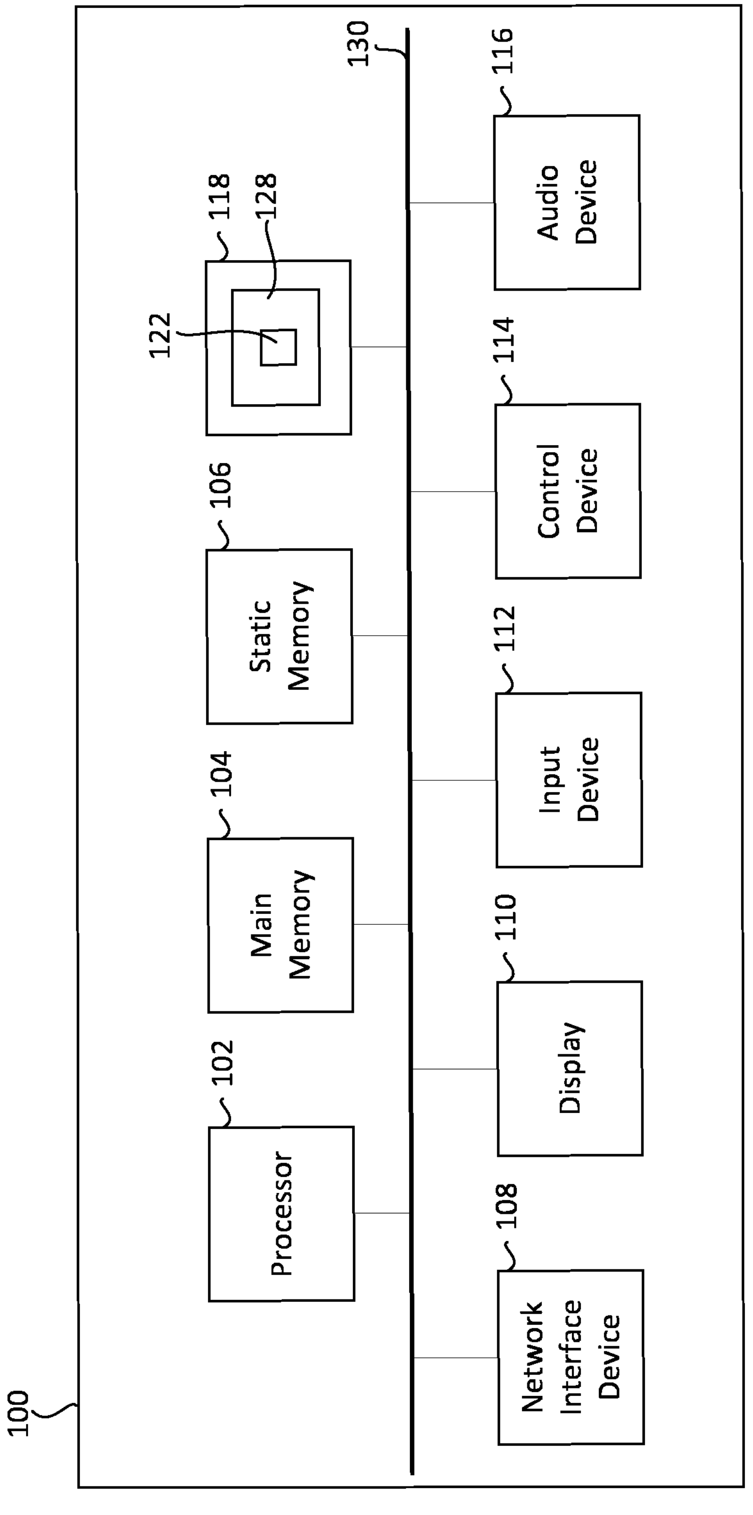
FIG. 1B illustrates a block diagram of one example implementation of a computing device.

FIG. 1B illustrates a block diagram of one example implementation of a computing device 100 (e.g. electronic device 20 and/or electronic devices 10, 12, 14 and 16 of FIG. 1A) that can be used for implementing the method of the present disclosure. The computing device is associated with executable instructions for causing the computing device to perform any one or more of the methodologies discussed herein. The computing device 100 may operate in the capacity of the data model or one or more computing resources for implementing the data model for carrying out the methods of the present disclosure. In alternative implementations, the computing device 100 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 100 includes a processing device 102, a main memory 104 (e.g., read-only memory (ROM), flash memory, dynamic random-access memory (DRAM) such as synchronous DRAM (SDRAM) or Rambus DRAM (RDRAM), etc.), a static memory 106 (e.g., flash memory, static random-access memory (SRAM), etc.), and a secondary memory (e.g., a data storage device 118), which communicate with each other via a bus 130.

Processing device 102 represents one or more general-purpose processors such as a microprocessor, central processing unit, or the like. More particularly, the processing device 102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 102 may also be one or more special-purpose processing devices such as an application specific integrated circuit (ASIC), a field programmable gate array (FPGA), a digital signal processor (DSP), network processor, or the like. Processing device 102 is configured to execute the processing logic (instructions 122) for performing the operations and steps discussed herein.

The computing device 100 may further include a network interface device 108. The computing device 100 also may include a video display unit 110 (e.g., a liquid crystal display (LCD) or a cathode ray tube (CRT)), an alphanumeric input device 112 (e.g., a keyboard or touchscreen), a cursor control device 114 (e.g., a mouse or touchscreen), and an audio device 116 (e.g., a speaker).

The data storage device 118 may include one or more machine-readable storage media (or more specifically one or more non-transitory computer-readable storage media) 128 on which is stored one or more sets of instructions 122 embodying any one or more of the methodologies or functions described herein. The instructions 122 may also reside, completely or at least partially, within the main memory 104 and/or within the processing device 102 during execution thereof by the computer system 100, the main memory 104 and the processing device 102 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Cloud Gaming

With bandwidths and data transfer rates of telecommunication systems continuing to advance, many of today's computing needs are shifting towards network-based distributed computing systems, commonly referred to as "cloud computing." Generally speaking, cloud computing involves offloading certain computing tasks to one or more remote computing resources and utilizing the remote computing resources to provide services to a local device. Cloud computing is often implemented as a client-server model, with the remote server (or networked group of servers) providing desired computing capabilities to a local client device, avoiding the need for the local client device to perform certain computing tasks on its own. In many instances, the computing resources can be entirely or almost entirely offloaded to the server, with the client providing little or no more than a user interface for the cloud computing task, allowing potentially any internet connected device to serve as a client for a particular application.

Cloud computing has been adopted in a wide variety of computing services, including remote data storage solutions, music and video streaming services, and a wide variety of other consumer and business solutions. In general, cloud computing provides several well-known benefits, including increased efficiencies through the use of shared resources, increased flexibility in accessing content without restriction to a particular device, lower up-front costs when hardware upgrades become available, and other advantages.

Video games, including personal computer (PC) games, home console games, handheld console games, and the like, remain a popular source of entertainment among consumers. With a large and ever growing collection of available video game titles, cloud gaming provides a particularly attractive solution to many video game demands. Ideally, within a cloud gaming framework a user would be able to instantly access any video game title from among a vast collection of remotely stored titles, without needing a physical copy of the game, without having to wait for the title to download, and without locally possessing the hardware system or resources needed to run the game. Implementing this type of service within a traditional cloud computing server design presents several technical challenges that have thus far prevented widespread adoption of cloud gaming for many video game platforms.

One challenge is that many of today's video games are very fast paced and action packed, with advanced graphics that require a significant amount of computing resources to render. Particularly in a video streaming based server design, in which all of the game computations and graphics rendering computations are performed remotely, the game needs be able to perform all these tasks and deliver a compressed audio/video stream to the client device with minimal to no perceptible latency in response to control inputs. Otherwise, this may disrupt the timing for the player and fail to replicate the responsiveness of a traditional locally executed gaming session.

Figure 2:
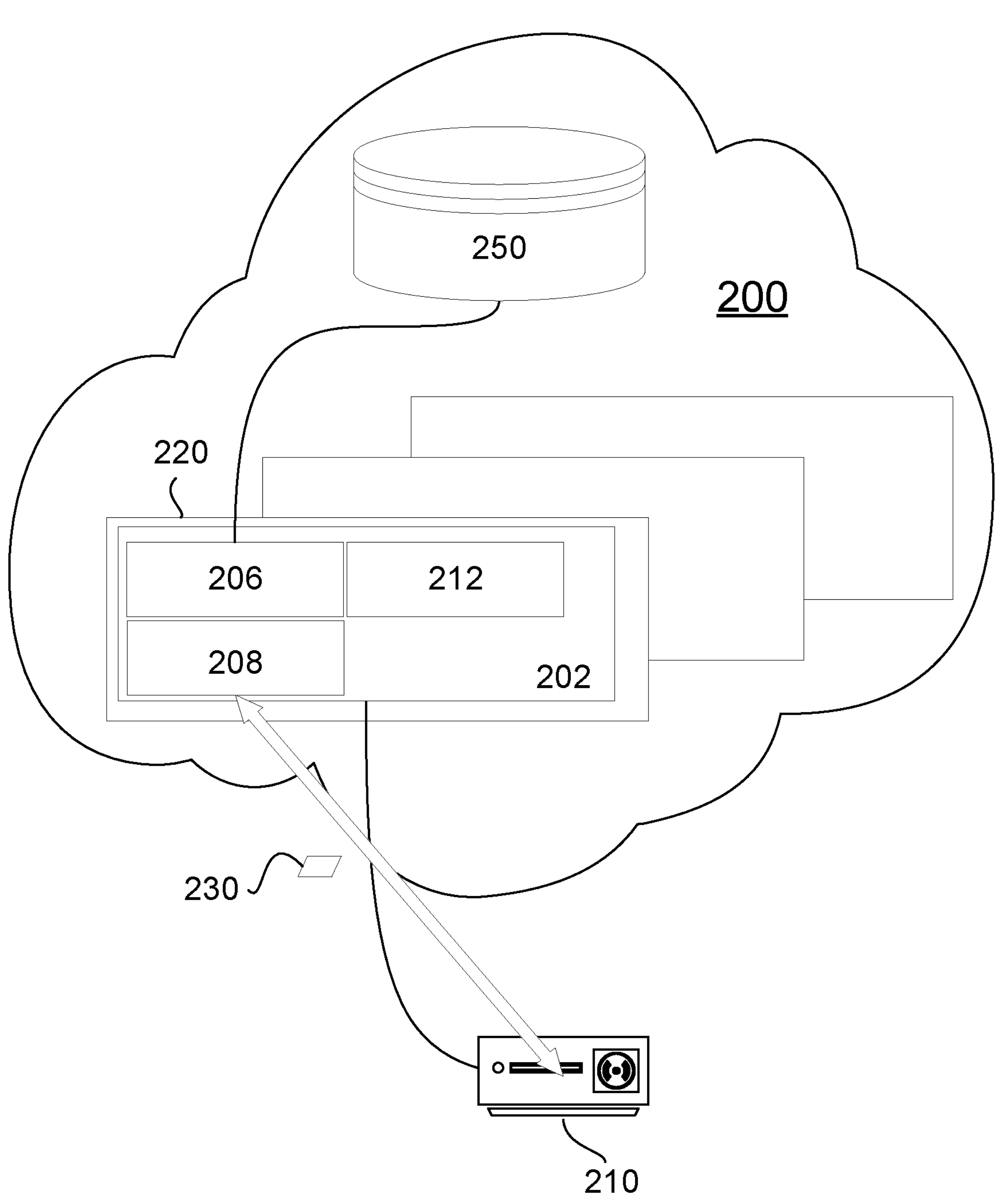
FIG. 2 is diagram showing a system according to an embodiment of this disclosure.

FIG. 2 illustrates certain functional elements in an example cloud computing platform. A user account is used to access a cloud gaming site 200. The cloud gaming site 200 includes one or more networked server devices 220 through which one or more users would be able to access one or more video game titles from among a plurality of remotely stored titles, stored in a data storage 250. At least one of the server devices 220 executes a game loader module 202, the game loader module including a game title selection manager 206, an interaction manager 208, and prediction logic 212.

In response to a request to access the cloud gaming site 200, the cloud gaming site 200 authenticates the user account and returns a list of game titles that are available for the user account at the cloud gaming site 200 for rendering on a display screen of a client device 210 for user selection (e.g. device 100 of FIG. 1B).

In some embodiments, each game title presented for the user account may include game code and informative content, such as brief description of the game, one or more representative game scenes or game images, game rating, game clips or game recordings, game type, etc. When user interaction is detected at or near one of the game titles rendered on the client device 210, the client device 210 sends an interaction signal 230 to the cloud gaming site 200 about the detected user interaction. The interaction signal 230 includes a game title identifier of a game at or near which the activity was detected.

The interaction manager 208 within the game loader module 202 receives the transmitted interaction signal and examines the signal to identify the game title identifier included in the signal. The interaction manager 208 may interact with the game title selection manager 206 to use the game title identifier to identify the game title from among the game titles available for the user account at which the user interaction was detected.

The interaction signal may also include a type of activity (i.e., active or passive activity) detected at the client device 210. The type of user interaction (i.e. user selection or hovering activity) may be used to determine whether to initiate the identified game title (i.e. game code) or to download only informative content related to the game title.

User-specific portions of the game, such as game winnings/credit, game levels, game icons, game objects, user-specific game customizations (e.g. user-defined personalizations), are loaded when an active user interaction (i.e., user selection) is detected at the game title: these portions are loaded based on user profile information associated with the user account and the selected game title.

In some embodiments, a user session is created when a user accesses the cloud gaming site by logging in through a user account. The session allocates a "game seat" for the user. The game seat identifies the processing resources that need to be allocated by the cloud gaming site, such as the processing power, GPU power, memory, communication bandwidth, etc., for the user to enable the user to have a satisfactory game play experience.

The processing resources identified for the game seat of the user may be based on predicting prior usage of the user and type of game title the user selects to play, and such information may be provided by the prediction logic 212 of the game loader module 202. Thus, when the user logs in to the cloud gaming site 200, the prediction logic 212 will calculate the resources to assign to the game seat (i.e., user session) based on historic game play of the user. Once the user's session is created and the necessary processing resources allocated, it is considered likely the user will use the assigned resources for the gaming session.

After the user starts playing, the game play of the user is monitored at predetermined intervals. If it is determined, during monitoring, that the user is not playing at a resource demand level for which the processing resources were allocated, then the prediction logic 212 will send a signal to the game loader module 202 to change the resources dynamically for the user so that the processing resources are not over-allocated to the user. A similar signal may also be generated when the prediction logic 212 determines that the processing resources are under-allocated for the gaming session, in one embodiment.

The conventional cloud gaming arrangement described above may nevertheless deliver underwhelming results in terms of user experience since the mechanics of the game may present a barrier to enjoyment of the game for certain users. For instance, in certain games, it is necessary to overcome a particular challenge or master a particular battle mechanic before progressing to a new game level. One user may be frustrated by the difficulty of achieving such goals, whereas another may find achieving the same goals tiresome because they represent a necessary, repetitive, but unrewarding chore (i.e. a "grind").

It is known to allow users (i.e. players of a game) to select a "difficulty" level for themselves (this being stored in a player profile for future use in that game). It is also known to generate a more detailed player profile that may be used by game developers to personalize the player experience.

In accordance with an embodiment, a cognitive state module of a game loader in a cloud gaming site (such as the site 200 in FIG. 2) monitors for data indicative of the cognitive state of a user. This data may be operational data (such as the system time, session time, latency, geographic region, etc.) and/or sensor data gathered from the user device and/or user peripherals, the sensor data indicative of behavioral and/or physiological signals.

Figure 3:
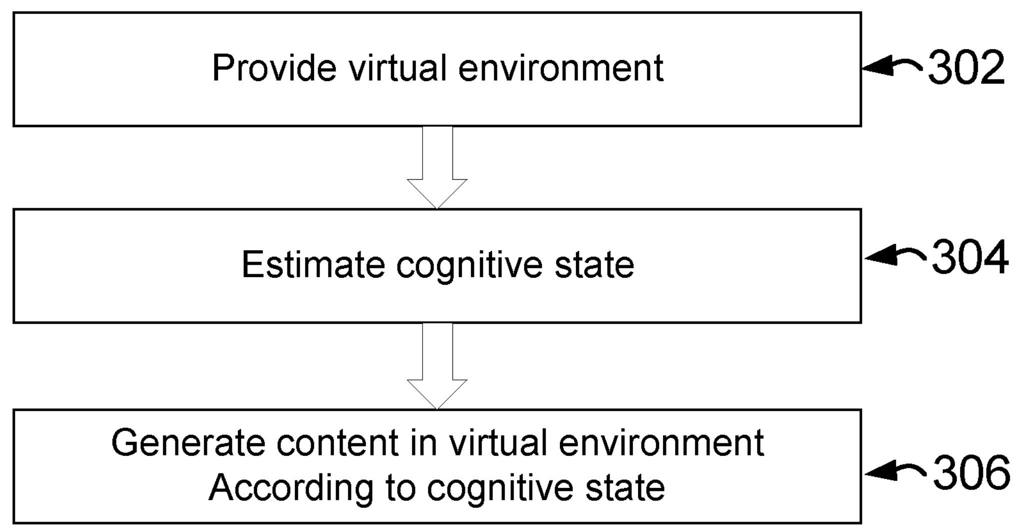
FIG. 3 is a flowchart showing a method of operation of the system according to an embodiment of this disclosure.

The flowchart in FIG. 3 illustrates a method of operation of a system according to an embodiment of this disclosure. At operation 302, the system provides a virtual environment for a user (e.g. loads a game environment by providing user access to a cloud gaming site and a gaming seat in a selected game title). The system then estimates a cognitive state of the user, operation 304. This estimation may be a real-time estimate of an instantaneous cognitive state and/or an estimate of a change of cognitive state over a predetermined period of monitoring. The system then executes the virtual environment to generate content in accordance with the estimated cognitive state of the user, operation 306.

Peripherals for enabling users to provide more natural inputs have been used for many years; this is especially true in the case of gaming devices (such as the Sony® PlayStation® 4 and Sony® PlayStation® 5, both of which have a range of associated game controller peripherals). Other examples of peripheral inputs include a keyboard, a pointing device (such as a computer mouse or a touchpad), and a camera but also inputs may also be supplied by an optical disc drive, a networking equipment, a storage device, and or a memory card. Peripherals also supply outputs that the user can engage with such as a display, a printer, a speaker/headphones, etc. In some cases, such as game controllers, peripherals provide means for both input and output (through generated vibrations and other haptic effects).

Conventional game controllers include a plurality of user control buttons, thumbsticks and/or joysticks which may sense gradations in applied pressure (e.g. though piezoelectric circuits) and direction as well as motion sensor components for determining the orientation and position of the controller.

Of course, the pattern of usage of the buttons, thumbsticks etc. of a controller over time by a user may also be valuable input for determining behavioral and/or physiological state, or changes thereof. Examples of behavioral data determined through gathered sensor data include metrics of reaction time, frequency of button presses, accuracy and speed of operation of thumbsticks. This behavioral data may, for instance, each be generated at the user device or indeed gathered in the game server executing the game title for the user.

Where game controller peripherals use accelerometers, gyroscopes or other hardware motion sensors to detect motion of the peripheral, this tracked motion may be used as user input for a given game mechanic, enabling more natural motions (such as moving a game controller to simulate a corresponding movement of a game avatar) to be used instead of button presses so as to increase the immersiveness of the content.

In certain cases, only relative motion of the peripheral is tracked. In other cases, it may be beneficial to track absolute position (i.e. a position in the real environment). To obtain absolute position it is known to track the peripheral using a camera collocated with the peripheral. The captured image data may then be used to obtain additional measurements of the position of the peripheral, which in turn may be used to correct the detected motion from the hardware motion detectors (e.g. gyroscope and/or accelerometer).

More immersive experiences are offered by head-mountable display units (HMDs) that enable users to experience virtual reality (VR), mixed reality (MR) and/or augmented reality (AR) content. A user's level of immersion in such an experience is considered to be important to their enjoyment of the displayed content, and as such the use of motion-tracked peripherals is seen as being desirable.

Certain HMDs incorporate means for tracking the direction and/or movement of the user's eyes (such as inward facing cameras) so that the user's gaze may be tracked. More recent peripheral devices, typically those used in association with fitness applications, directly monitor other physiological metrics of factors such as heart rate, blood pressure, galvanic skin response (which may be understood to correspond to a level of perspiration) and even brain activity, through electroencephalography (EEG) techniques.

Examples of physiological data determined through gathered sensor data include hand and/or head poses (from accelerometer, gyroscope and/or other motion sensor elements in corresponding peripheral devices), gaze direction (from eye/head pose tracking), audio pickup (from microphones, etc.), as well as other directly monitored physiological metrics.

In certain embodiments, sensor data from any (or all) of these peripheral sensor elements may be used to estimate a cognitive state of the user. However, the sensor data alone may only crudely be associated with particular cognitive states (e.g. extreme boredom/disengagement associated with an immobile controller or excessive agitation associated with high heart rate). To allow a more accurate estimate of the cognitive state of users, the sensor data is provided as input to a trained machine learning (ML) model, the model being arranged to output the estimated cognitive state of the user as a computer-readable "vector". This may be a generalized user agnostic model or a model constructed for each user individually.

Figure 4:
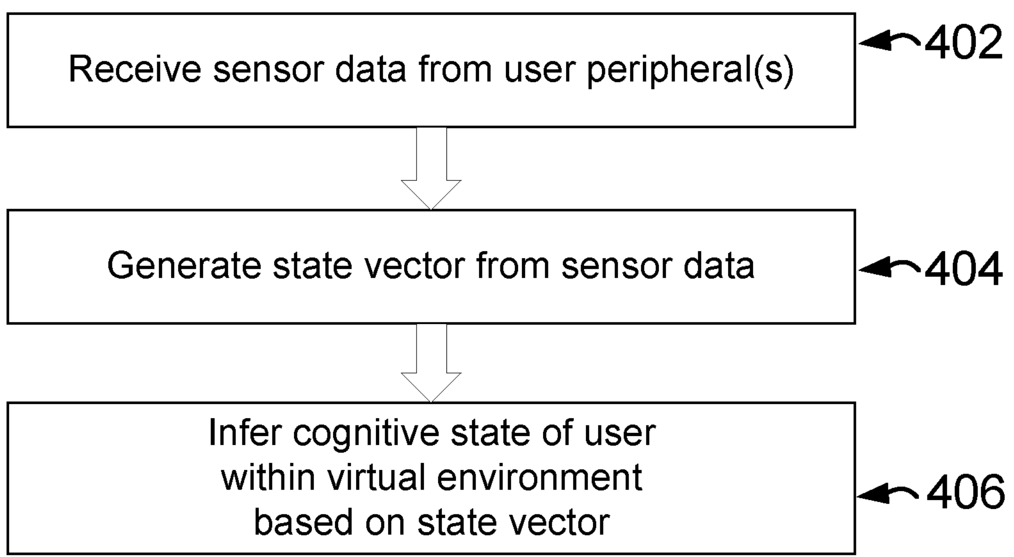
FIG. 4 shows functional details of the estimation of cognitive state according to certain embodiments of this disclosure.

The flowchart in FIG. 4 illustrates functional details of the estimation of cognitive state (step 304 of FIG. 3). At operation 402, the system receives sensor data from one or more user peripherals. The system then generates a state vector from the received sensor data (and, optionally, from operational data, such as the system time, session time, latency, geographic region, etc.), operation 404. For instance, the state vector is output by the trained ML model based on the input of the sensor data. The state vector is then processed by the system to infer the cognitive state of the user, operation 406. The state vector is used by the system to generate content in the virtual environment that is responsive to the inferred cognitive state (see step 306 of FIG. 3).

Training of Model

In a ML-based approach where a generalized user agnostic model is trained from an offline dataset, the data set would ideally be a large, labelled collection of human cognitive states according to different physiological and behavioral signals obtained from a plurality of users. The model would therefore estimate the player state vector for any given player from its knowledge of a large population of players. The generalized user agnostic model would then be deployed on the cloud gaming site and executed by one or more game servers.

In an alternative ML-based approach where a model is constructed for each user individually using federated learning, personalized models are trained based on the historical behavior of each specific player. In this approach the complexity of dataset collection is somewhat reduced as training data may be obtained by means of a user calibration during the first setup of the console.

In certain embodiments of the latter approach, a proprietary pre-installed game may be used by the console to collect and locally store information (i.e. gathered sensor data) regarding the player. To gather a cross-section of information, the pre-installed game is arranged to present instances of the game at different levels of difficulty or complexity. The main data for the game may still be stored locally, allowing uploads to be restricted to updates on this stored data, not the actual data collected, to the cloud-based model. The combination of locally stored main data and cloud based update data results in game mechanics tailored to the specific user.

For either approach, once the model is trained and deployed on the cloud gaming site, it is configured to be accessible from a gaming engine (i.e. an engine executing a game title on a gaming server) as a simple query-based system. In certain embodiments, data acquired by the engine (such as the current session duration, current time) and data acquired from the user (such as sensor data) are input into the model and a player state vector is output. A player state service executing in the cloud gaming site provides player state vectors, representing the estimated cognitive state of a user, to a requesting game engine.

The player state vector may be structured as an N-tuple, [focused; engaged; tired; . . . ; bored]. An example player state vector for a given instance of game play might be=(60%; 80%; 15%; . . . ; 35%).

In certain embodiments, the player state vector definition may be standardized and made available to games developers so that they may configure a game engine interface that queries, whether according to simple if/then rules or more complex policies, the player state service to obtain this vector in a form that may be used to alter one or more aspects of the operation of the game mechanics.

Deployment of Model

In roguelike games, such as Returnal, where level instances are procedurally generated, a game engine of the game title currently being provided to the user could access the player state service through the game engine interface before generating each new level to decide, for example, whether: a) a lower difficulty level is preferable since the player is tired or stressed b) a more challenging level is preferable because the player is starting to get bored, etc.

In a further example, illustrating how the player state vector can be used for more than just complexity or difficulty adaptation, the player state service may be used in a horror game to identify whether it is the right time to introduce a "jump scare" event on the player or not. In other words, a menacing encounter can be procedurally generated without detracting from the user experience.

In another example, the service may be used by a driving game to identify what type of tracks and manoeuvres cause more stress in the player and suggest "training" on specific sections. Indeed, a driving game may use the player state service to generate a track that would tend to challenge the player, while avoiding boredom or frustration.

In another example, the service may trigger an in-game event intended to counter an estimated state of boredom.

In yet another example, the service may estimate that a player is overly challenged by current operation of a game engine and may prompt the game engine to generate procedurally enemies that are easier to avoid or defeat.

In certain embodiments, the game engine cooperates with other instances of game engines to provide multiuser games. Here, changes to the game mechanism due to inferred cognitive state are applied for one player, independently of other players.

The assistance provided to a player may of course be something other than a direct intervention in the game mechanic (like easier battles, fewer opponents, etc.) but may be translated into granting a longer range "minimap" in a Heads-up display (HUD) to give warning of opponents at greater range. Thus the user cognitive state (in the form of the player state vector) may be used to alter any parameter of the game mechanic to adapt the user experience to the user dynamically.

To a game developer, the insight presented by monitoring for changes in user cognitive state may be used to predict resource usage (e.g. local storage/garbage collection, processing power, bandwidth requirement, etc.) so that the individual may continue with satisfying gameplay (e.g. at a predetermined quality of service, QoS, level) without drawing excessive resource. For example, if the player state vector indicates that gameplay should continue without certain in-game events or encounters, lower cloud storage resource may be required.

In certain scenarios, the user of a client device/peripheral may change. Monitoring of the sensor data from the user device may then indicate such a change. In order to maintain game integrity, the abruptly-changed state vector may be used to indicate the need for recalibration in-game (through updates) or through renewed querying of the ML model.

Although particular embodiments of this disclosure have been described, it will be appreciated that many modifications/additions and/or substitutions may be made within the scope of the claims and their equivalents.

The invention claimed is:

1. A computer-implemented method of providing dynamic content in a virtual environment of a video game session hosted on a cloud platform, comprising:

executing, by a game engine of the cloud platform, the video game session thereby providing the virtual environment to a user of the video game session;

estimating a cognitive state of the user by:

receiving sensor data from user peripherals, the sensor data indicative of behavioral or physiological signals associated with the user; and receiving operational data associated with the video game session, the operational data comprising a session time, a latency time, a geographic region of the user, or any combination thereof;

generating a state vector from the sensor data and the operational data, the state vector representing the cognitive state; and generating content in the virtual environment based on the state vector, wherein generating content in the virtual environment based on the state vector includes allocating one or more computational resources based on the state vector.

2. The computer-implemented method of claim 1, wherein estimating the cognitive state of the user comprises at least one of:

estimating the cognitive state of the user in real time; and estimating a change in cognitive state of the user over a predetermined period.

3. The computer-implemented method of claim 1, wherein the state vector is generated using a machine learning cloud-deployed model.

4. The computer-implemented method of claim 1, wherein the sensor data includes at least one of reaction times, frequency of button presses, and speed on left/right thumb-sticks.

5. The computer-implemented method of claim 1, wherein sensor data indicative of physiological signals includes at least one of: hand poses estimated from an accelerometer and/or gyroscope in a user peripheral; eye or gaze tracking in VR-based games; headphone audio pickup; head poses estimated from an accelerometer and/or gyroscope in a head mounted display, HMD, or headphones; or galvanic skin response or electrochemical activity detected in a user peripheral.

6. The computer-implemented method of claim 3, wherein the machine learning cloud-deployed model is a generalized user agnostic model that is trained from an offline dataset and deployed on the cloud platform.

7. The computer-implemented method of claim 6, wherein the training data set is a labelled collection of cognitive states according to different physiological and behavioral signals from a plurality of users.

8. The computer-implemented method of claim 3, wherein the machine learning cloud-deployed model is trained based on a specific player through federated learning and deployed on the cloud platform, thereby training personalized models.

9. The computer-implemented method of claim 8, wherein training through federated learning includes performing user calibration during a first setup phase for said specific player.

10. The computer-implemented method of claim 9, wherein said user calibration includes, for a predetermined application, collection of data from interaction with a predetermined calibration application.

11. The computer-implemented method of claim 10, wherein user calibration data is stored locally.

12. The computer-implemented method of claim 8, wherein further updates corresponding to changes in user interactions are transmitted to the machine learning cloud deployed model.

13. The computer-implemented method of claim 3, wherein once the machine learning cloud-deployed model is trained and deployed on the cloud platform, the method further comprises providing a query-based interface thereby rendering estimates of the cognitive state vector from the model accessible from an engine providing the virtual environment.

14. The computer-implemented method of claim 1, wherein the cognitive state of the user indicates the user being at least one of: tired, stressed, bored, or engaged.

15. A cloud platform system, comprising:

a processor; and memory including executable instructions that when executed configure the processor to perform operations comprising:

executing a video game session thereby providing a virtual environment to a user of the video game session;

estimating a cognitive state of the user by:

receiving sensor data from user peripherals, the sensor data indicative of behavioral or physiological signals associated with the user; and receiving operational data associated with the video game session, the operational data comprising a session time, a latency time, a geographic region of the user, or any combination thereof generating a state vector from the sensor data and the operational data, the state vector representing the cognitive state; and generating content in the virtual environment based on the state vector, wherein generating content in the virtual environment based on the state vector includes allocating one or more computational resources based on the state vector.

16. The system of claim 15, wherein estimating the cognitive state of the user comprises at least one of:

estimating the cognitive state of the user in real time; and estimating a change in cognitive state of the user over a predetermined period.

17. The system of claim 15, wherein the state vector is generated using a machine learning cloud-deployed model.

18. The system of claim 17, wherein the machine learning cloud-deployed model is a generalized user agnostic model that is trained from an offline dataset and deployed on the cloud platform.

19. The system of claim 17, wherein the executable instructions when executed further configure the processor to perform operations comprising:

once the machine learning cloud-deployed model is trained and deployed on the cloud platform, providing a query-based interface thereby rendering estimates of the cognitive state vector from the model accessible from an engine providing the virtual environment.

20. A non-transitory computer readable storage medium comprising instructions that when executed configure a processor of a cloud platform to perform operations comprising:

executing a video game session thereby providing a virtual environment to a user of the video game session;

estimating a cognitive state of the user by:

receiving sensor data from user peripherals, the sensor data indicative of behavioral or physiological signals associated with the user; and receiving operational data associated with the video game session, the operational data comprising a session time, a latency time, a geographic region of the user, or any combination thereof generating a state vector from the sensor data and the operational data, the state vector representing the cognitive state; and generating content in the virtual environment based on the state vector, wherein generating content in the virtual environment based on the state vector includes allocating one or more computational resources based on the state vector.

* * * * *